(12) United States Patent
Neuenschwander et al.

(10) Patent No.: US 11,979,014 B2
(45) Date of Patent: *May 7, 2024

(54) AUTOMATED VEGETATION MANAGEMENT SYSTEM

(71) Applicant: HONEYWELL INTERNATIONAL INC., Morris Plains, NJ (US)

(72) Inventors: Victoria Neuenschwander, Cary, NC (US); Ann Perreault, Bloomington, MN (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 1155 days.

This patent is subject to a terminal disclaimer.

(21) Appl. No.: 16/251,586

(22) Filed: Jan. 18, 2019

(65) Prior Publication Data
US 2020/0235559 A1 Jul. 23, 2020

(51) Int. Cl.
| | |
|---|---|
| *H02G 7/00* | (2006.01) |
| *B64C 39/02* | (2023.01) |
| *B64U 101/30* | (2023.01) |
| *G05D 1/00* | (2006.01) |
| *G06Q 10/00* | (2023.01) |

(52) U.S. Cl.
CPC ............ *H02G 7/00* (2013.01); *B64C 39/024* (2013.01); *B64U 2101/30* (2023.01); *G05D 1/042* (2013.01); *G06Q 10/00* (2013.01)

(58) Field of Classification Search
CPC .................. B64C 39/024; B64C 2201/127
See application file for complete search history.

(56) References Cited

U.S. PATENT DOCUMENTS

| | | | | |
|---|---|---|---|---|
| 10,242,349 B1* | 3/2019 | Arya | ...................... | G06Q 50/06 |
| 10,880,623 B2* | 12/2020 | Saha | .................. | G06Q 10/0635 |
| 2004/0236620 A1* | 11/2004 | Chauhan | ................ | G06Q 10/06 705/7.14 |
| 2010/0198775 A1* | 8/2010 | Rousselle | ............ | A01B 79/005 706/54 |
| 2013/0261828 A1* | 10/2013 | Hyde | ...................... | H02G 1/02 700/292 |
| 2014/0172514 A1* | 6/2014 | Schumann | ....... | G06Q 10/06393 705/7.39 |

(Continued)

*Primary Examiner* — Jess Whittington
(74) *Attorney, Agent, or Firm* — John Maldjian, Esq.; Stevens & Lee PC

(57) ABSTRACT

A vegetation management system includes a computing system including a processor having an associated memory that is configured for implementing a vegetative modeler including an image analyzer and at least one 3-dimensional (3D) vegetation growth model. The vegetative modeler is for analyzing images of vegetation that is growing around electrical power lines of an electric utility including identifying locations of the vegetation relative to locations of the electrical power lines and to identify specific types of the vegetation. The 3D vegetation growth model utilizes at least the locations of the vegetation relative to the locations of the electrical power lines and the specific types of the vegetation to generate a predicted timing of encroachment of the electrical power lines by the vegetation to identify future encroachment areas. A scheduler is for scheduling vegetative maintenance of the vegetation for the future encroachment areas.

13 Claims, 3 Drawing Sheets
(1 of 3 Drawing Sheet(s) Filed in Color)

(56) References Cited

U.S. PATENT DOCUMENTS

| | | | |
|---|---|---|---|
| 2014/0316614 A1* | 10/2014 | Newman | G06Q 30/0611 |
| | | | 705/26.4 |
| 2015/0131079 A1* | 5/2015 | Heinonen | G06Q 10/0631 |
| | | | 356/4.01 |
| 2016/0140263 A1* | 5/2016 | Rojas | G05B 23/02 |
| | | | 703/18 |
| 2017/0098178 A1* | 4/2017 | Belhaj Amor | G06Q 30/0206 |
| 2018/0098137 A1* | 4/2018 | Saha | G06Q 10/20 |
| 2018/0283278 A1* | 10/2018 | Adibhatla | F01D 11/24 |
| 2020/0250424 A1* | 8/2020 | Klein | G06T 7/13 |
| 2021/0073692 A1* | 3/2021 | Saha | G06Q 40/08 |

* cited by examiner

AUTOMATED VEGETATION MANAGEMENT SYSTEM

FIELD

This Disclosure relates to vegetation management systems for protecting power lines of electric utilities.

BACKGROUND

Electricity distribution lines (power lines) used by electric utilities to deliver power to customers can become encumbered by vegetation overgrowth including branches of trees encroaching upon the safety corridor. Vegetation overgrowth including trees encroaching power lines is the leading cause of downed power lines during storms and other natural events. Power outages also can pose a public safety hazard such as when hospitals lack electrical power.

To combat this risk of vegetation-induced power outages, utilities or their contactors commonly prune trees, cut underbrush, and spray herbicides on the vegetation growing near their power lines. This vegetative management function is generally performed periodically, such as at a 1 to 10 year fixed interval.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize with the use of analytics, specifically weather patterns, region specific vegetation growth models, and vegetative maintenance contractor capacity, a new more highly effective vegetative management system for power lines of an electric utility can be provided which can save the utility operational expense, and can also improve the safety and reliability of the electricity distribution. By combining vegetative growth prediction models with weather models, and visual imagery of the vegetation (e.g., trees) around the power lines such as obtained by at least one imaging system, a timing and place of future power line encroachment by the vegetation can be predicted so that vegetative maintenance can be implemented proactively to help avoid power outages.

Disclosed aspects include a vegetation management system comprising a computing system including a processor having an associated memory that is configured for implementing a vegetative modeler including an image analyzer and at least one 3-dimensional (3D) vegetation growth model. The vegetative modeler is for analyzing images of vegetation that is growing around electrical power lines of an electric utility including identifying locations of the vegetation relative to locations of the electrical power lines and to identify the specific types of the vegetation. The 3D vegetation growth model utilizes at least the locations of the vegetation relative to the locations of the electrical power lines and the specific types of the vegetation to generate a predicted timing of encroachment of the electrical power lines by the vegetation to identify future encroachment areas. A scheduler is for scheduling vegetative maintenance of the vegetation for the future encroachment areas.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
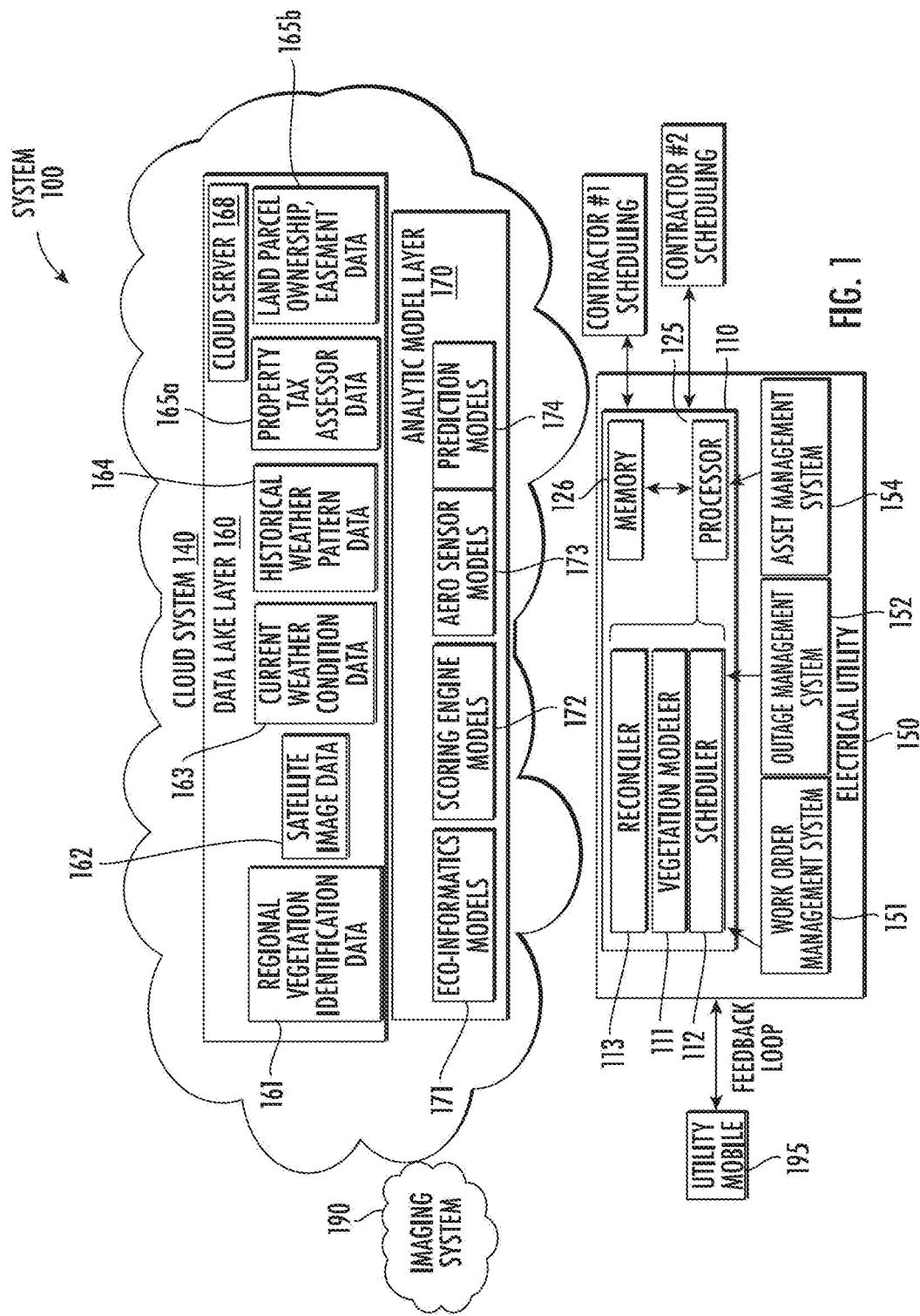
FIG. 1 is block diagram representation of an example vegetation management system including a vegetation management computing system that is shown accessing cloud system hosted components comprising a data lake layer and an analytics model layer, and visual imagery obtained from at least one imaging system, where the vegetation management computing system utilizes the data lake data, analytics modeling, and the visual imagery, along with utility data from the utility to generate the scheduling of vegetation control contactors, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed aspects include an automated vegetation management system for power lines of an electric utility that combines utility asset inspections through visual imagery of the vegetation around the power lines, and an analytics engine to schedule vegetation management vendors and view budgetary spending on vegetation management. One significant technical benefit provided by Disclosed aspects is a full service area visual mapping of the power lines of an electric utility and the prediction of vegetation encumbrances of the power lines that can affect the reliability of electricity distribution. It is estimated that disclosed vegetation management systems can reduce the utility's operation expense up to about ⅓ of its overall operations budget.

FIG. 1 is block diagram representation of an example vegetation management system 100 that shows the system accessing cloud system 140 hosted components generally including a cloud server 168 that implements a data lake layer 160 shown including satellite image data 162 for the visual imagery, as well as optionally other visual imagery obtained from an imaging system 190 such as UAV imaging, and an analytic model layer 170. A vegetation management computing system 110 is shown within the premises of an electric utility 150 that includes a processor 125 having a memory 126. The data lake layer 160 and an analytic model layer 170 both provide a variety of inputs to the vegetative management computing system 110. The processor 125 can comprise a digital signal processor (DSP), a microcontroller, an application specific integrated circuit (ASIC), a general processor, or any other combination of one or more integrated processing devices.

The vegetation management computing system 110 implements a vegetative modeler 111 including an image analyzer and at least one 3-dimensional (3D) vegetation growth model for analyzing images of vegetation that is growing around electrical power lines of the electric utility 150 including identifying locations of the vegetation relative to locations of the electrical power lines and to identify specific types of the vegetation. The vegetative modeler 111 includes regional models and 3D vegetation growth prediction models for the vegetation that utilizes weather models which are provided by prediction models 174 including weather prediction models as described below. Regional as used herein refers to geographical boundaries within a utility's service area weather.

The 3D vegetation growth model utilizes at least the locations of the vegetation relative to the locations of the electrical power lines and the specific types of the vegetation to generate a predicted timing of encroachment of the electrical power lines by the vegetation to identify future encroachment areas. Identification of the specific types of vegetation can be used to indicate the types of maintenance that should be performed, for example ash trees in North Carolina can be infected with a pest that weakens the structure of the tree which makes it more susceptible to breaking or falling.

The vegetative management computing system 110 also implements s a scheduler 112. The data utilized by the scheduler 112 can be viewed in the context of the utility's asset network. Vegetation maintenance prioritization can be ranked in terms of priority for the deemed most critical customers (e.g., hospitals, public safety and governmental offices) served and the number customers associated with specific distribution paths. The scheduler 112 can rank relative outage impacts based upon the node structure of the circuit upon which the vegetation may impact.

The vegetative management computing system 110 also implements a reconciler/auditor shown as a reconciler 113 that keeps track of work performed at a specific region corresponding to a utility's cost center within a specific time period. This can create efficiency metrics per contractor to assist an electric utility 150 in procuring future services.

The data lake layer 160 is shown including regional vegetation identification data 161, satellite images data 162, current weather condition data 163, historical weather pattern data 164, property tax assessor data 165a, and land parcel ownership and easement data 165b. The analytic model layer 170 is shown including eco-informatics models 171, scoring engine models 172, aero sensor models 173, and prediction models 174 that includes weather prediction models as described above. Historical weather pattern data 164 is a data source for the weather prediction models.

The data lake layer 160 is a secure environment where streaming data, historical data, and periodically refreshed data is controlled and administrated. This data and/or data connection environment (e.g., utilizing application programming interface (API) calls) is typically procured from a third party. Regional vegetation identification data 161 provides a list of vegetation commonly found in each specific geographic location. As described above, regional refers to geographical boundaries within a utility's service area that the vegetative modeler 111 uses. The regional vegetation identification data 161 may include a list of diseases or pests that affect respective vegetation species.

Satellite image data 162 is used for identification of areas of interest from storms or acts of nature. Satellite progression imagery is used to validate the growth predictions. Current weather condition data 163 is used for assessing the relative priority of vegetation maintenance. For example, if high winds or temperatures fostering frozen precipitation are occurring, it may reprioritize jobs in process. Historical weather pattern data 164 is used for climate considerations predictive growth analytics. Annual property tax assessor data 165a provides the legal ownership of a plot of land and easements. Land parcel ownership and easement data 165b includes deed purchase/sale data that shows new ownership of plots of land.

The electric utility 150 is also shown including a work order management system 151, an outage management system 152, and an asset management system 154 that are all known systems for an electric utility. These systems 151, 152, 154 all provide inputs to and/or outputs from the vegetative management computing system 110. The work order management system 151 is for electric utilities who use their own resource labor, where the work order management system 151 accepts inputs from the vegetation management system 100 to schedule internal work order "tickets", and the work order management system 151 sends data to the vegetation management system 100 such as a high priority work assignment, such as due to a recent downed tree on a power line that was observed from image data. The outage management system 152 is for all electric utilities, where the outage management system 152 can send high priority data to the vegetation management computing system's 110 meter IDs, transformer IDs along a circuit(s) indicating there is a sustained outage along an electricity distribution asset segment. The data from the outage management system 152 supports re-prioritization of jobs and can alert a contractor on-call to investigate and correct vegetation issues if it is found to be the cause of the power disruption. The asset management system 154 can send distribution network attributes to the vegetation management computing system 110 such as geolocation coordinates (e.g., latitude, longitude, height/altitude), the date installed, maintenance dates, the reason, and if a given asset is on private property, or on state or federally protected land.

Vegetation maintenance control contractors shown for simplicity as contactors 1 and contactor 2 are shown in FIG. 1 communicably coupled (e.g., by a mobile application for field applications and a secure Internet connection for the bidding process) to the electric utility 150 for accessing information including the predicted timing and predicted places of vegetative encroachment of the electrical power line data. The contractors can then place bids, and the scheduler 112 can utilize the contractor's bids to generate the scheduling of the vegetation control contactors. Disclosed vegetation encroachment predictions can thus be used by a scheduling application run by the scheduler 112 that schedules the vegetative maintenance and obtains contactor bids for specific vegetative maintenance work which enables the electric utility 150 to reduce vegetation management expenses. A mobile application shown as utility mobile 195 that is communicably coupled to the electric utility 150 can allow the electric utility 150 to verify the vegetation maintenance work has been performed. A data review allows for a cost assessment per contractor.

Figures 2A, 2B, 2C:
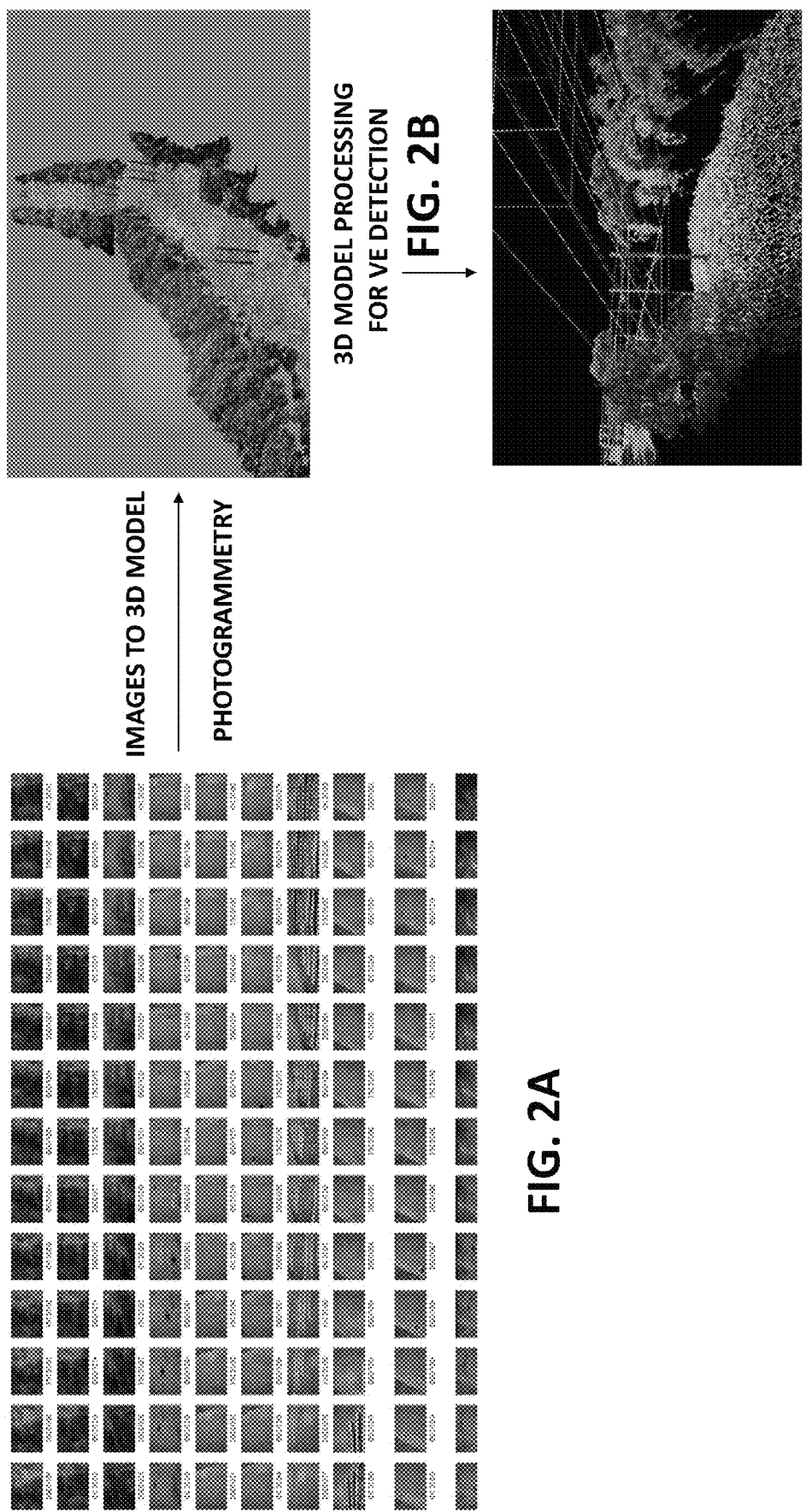
FIGS. 2A-2C depict an example of a disclosed vegetation encroachment (VE) analysis and VE identification utilizing 3D image modeling.

FIGS. 2A-C depict an example vegetation encroachment analysis, such as utilizing a hyperspectral analysis with LIDAR analytics. FIG. 2A shows an array of scanned images that are generally indexed using their corresponding time and location. FIG. 2B shows a scanned output from the 3D vegetation growth model showing the resulting photogrammetry from the images in FIG. 2A. FIG. 2C shows a sample scanned output for vegetation encroachment detection obtained from the 3D vegetation growth model data processing. The vegetation encroachment analysis is provided first by a disclosed imaging system 190 providing image data to the vegetation modeler 111 for identification of the specific region corresponding to the electrical utility's 150 cost center using a plurality of the geo-coordinates tagged, assets (e.g., utility pole, power line), vegetation type(s) identified, camera angle and position, and current encroachment points identified from the image data.

Some image data that is determined to have low relative value may be discarded and thus not analyzed. The specific region corresponding to the electrical utility's 150 can then be further joined to the analytic model layer's 170 models (171, 172, 173, 174) with the output from the analytic model layer 170 fed back to the vegetation management computing system 110. The key data elements provided by the vegetation encroachment analysis are generally 1) vegetation identification, 2) measurements of the vegetation encroaching upon the corridor which is a government dictated area surrounding a distribution system asset, measuring above, below, left and right in which nothing should enter, 3) visual defects in the structural integrity of a distribution asset such as a crack in a pole, crossbar or assets affixed to a power pole such as a crack in a bell, and the 4) time/location the visual inspection occurred.

Disclosed vegetation management systems apply to the particular application of electrical power utilities, specifically to protecting their power lines from damage from encroaching vegetation such as trees. Disclosed automated vegetation management systems solve a specific technical problem rooted in the electric power utilities, that being how to utilize utility asset inspection data together with a model-based prediction of future encumbrances by the vegetation to schedule vegetation contactors and optionally view budgetary spending on vegetation management. Disclosed vegetation management systems can allow an electric utility to trace and quantify the impact of a power outage through the distribution system down to the electricity end consumer by categorizing geographic information system (GIS) distribution endpoints, and assessing the relative impact should a power outage occur.

A weighted prioritization can occur for areas to perform maintenance due to a projected outage impact. Additionally, distribution assets pertaining to critical infrastructure such as feeders to hospitals or public security entities can be factored in as being a high priority. A companion mobile application (e.g., the utility mobile 195 shown in FIG. 1) can provide direct input of verification/audit that vegetation maintenance has occurred by a contractor and to provide a method in which to trigger emergency maintenance when a field siting elevates an area's priority to an imminent power disruption.

The vegetation management computing system 110 can also provide legal documentation support for private entities to clear right of ways, and the reconciling of maintenance spending to budget and contracts to performance. The reconciler 113 as described above can also keep track of work performed at a specific region corresponding to the electrical utility's 150 cost center within a specific time period thereby creating efficiency metrics per contractor to assist the utility in procuring future services.

Components that can support a disclosed vegetation management system 100 include analysis of local native vegetation for service territory, analysis of local native vegetation growth patterns for service territory, analysis of historical weather for the service territory, a precipitation forecast for service territory, UAV video or LIDAR footage of distribution assets, satellite imagery of service territory, mobile laser footage of service territory, GIS location of distribution assets, vegetation identification from imagery, measurement capability from imagery, and shadow discernment capability which comprises the ability to filter out extraneous light or dark to firmly identify/detect objects from the imagery. Available data can include distribution asset GIS codes from the customer, UAV footage for same distribution assets (e.g., video and LiDAR), and weather data including the current and historical weather data, shown as current weather condition data 163, and historical weather pattern data 164 in FIG. 1 from an Internet of things (IoT) platform data lake, such as the data lake 160 also shown in FIG. 1.

An example workflow cycle can include the vegetation management system 100 identifying needed actions, planning such actions, having the actions performed (e.g., tree trimming), auditing the actions to ensure 3r d party crews are in compliance with utility work contracts, updating the outstanding maintenance jobs in the work queue as successfully or unsuccessfully completed, and repeating the workflow by then again having the vegetation management system 100 identifying needed actions. The visual imagery enables identifying the types of vegetation (e.g., types of trees, bushes and vines) and their proximity to line corridors of the power lines and other power distribution assets. Predictive analytics can be used to numerically score regions in order of the predicted time of vegetative encroachment which can indicate relative priority in performing maintenance around the locations of the electrical power lines areas regions and the types of equipment needed to perform maintenance.

The planned data is used by the scheduler 112 to create bids for contractors and contracts for specific vegetation maintenance work and timeframe. Contractors can have visibility into the requirements from the electric utility 150. The utility mobile 195 in FIG. 1 allows the electric utility 150 to verify the vegetation maintenance work has been performed to satisfaction and remedy non-performance as needed. A data review allows for cost assessment per contractor. If the GIS coordinates of an asset are incorrect, the asset inventory can be updated per auditor's request, and allow for a periodic (e.g., daily) budget review. The Key Performance Indicators (KPIs) for the electric utility can also be budgeted price vs. actual cost per region, efficiency per contractor—over/under per contract, work completed year-to-date (YTD) by contractor, units per region, cost per region, and miles and cost YTD.

EXAMPLES

Disclosed embodiments of the invention are further illustrated by the following specific Examples, which should not be construed as limiting the scope or content of this Disclosure in any way.

As an example use case for a disclosed vegetation management system 100, a utility asset maintenance director at an electric utility generally needs to reduce the electric utility's operational expense by scheduling line walks, truck rolls and arborist, and vegetation crew engagements more efficiently. The solution acceptance criteria for an electric utility can include a scheduling system for vegetation management resources, internal resources, and external contracted resources including KPIs to illustrate effectiveness in cost reduction, and understand land parcel ownership and document encroachment for support in private entity maintenance requests.

Figure 3:
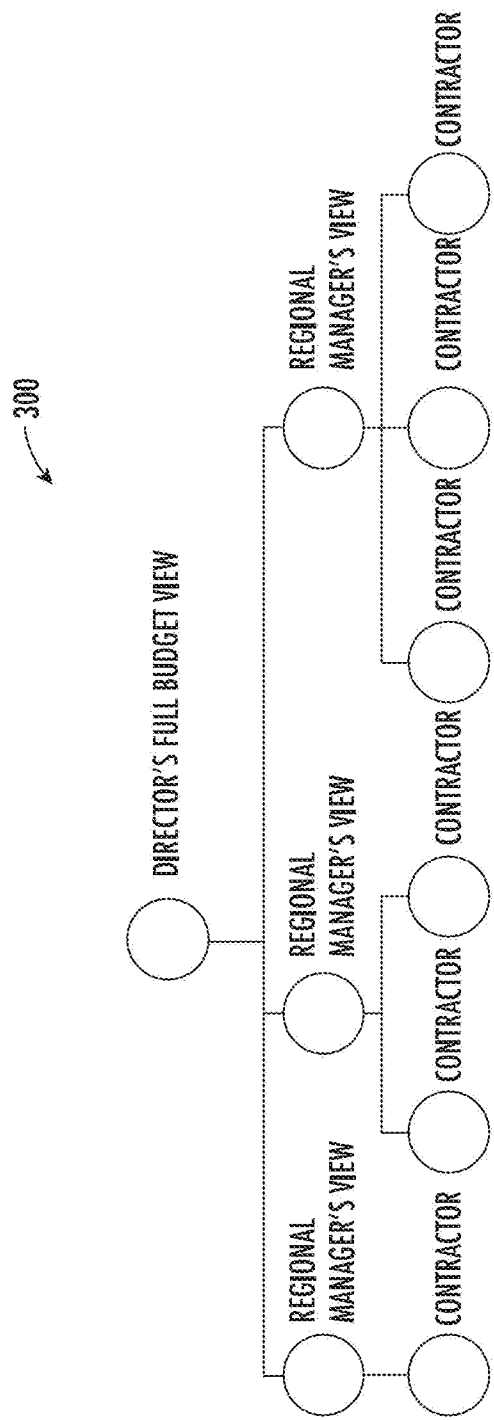
FIG. 3 shows an overall vegetation management system aggregation view, showing contactors' views, regional utility manager's views, and a utility director's views.

FIG. 3 shows an overall system aggregation view 300, showing contactor's views, regional utility manager's views, and utility director's views. The director's full budget view covers the respective regions shown by example as 3 regions. Each region can have one or more associated contractors. For an electric utility director who has responsibility for multiple regions/states/geographical entities, an aggregated view with associated monetary and efficiency KPI's are available. For a regional manager, a limited view of his or her responsible cost center is provided. A contractor generally has visibility into his company's efficiency metrics and KPI's only.

In one specific scenario, regarding the square footage that vegetative encroachment corrective work completed and the year to date (YTD) money spent, ABC Contractor 1,000 out of 250,000 sq. ft, DEF Contractor 0 out of 500,000 square (sq) foot (ft), GHI Contractor 99,000 out of 100,000 sq ft, and the total as of 6/30/18 completed shown as 100,000 out of 850,000 sq ft. The contracts awarded and completed can comprise ABC Contractor, Region 1, $200,000, Jun. 30, 2018, DEF Contractor, Region 2 $300,000, Jun. 30, 2017, GHI Contractor, Region 3 $400,000, Mar. 31, 2018. Understanding the region area and type of equipment needed for the vegetative management services allows for a more competitive contactor bidding process for the electric utility.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method of vegetation management for an electric utility, comprising:
    implementing a vegetative modeler including an image analyzer and at least one 3-dimensional (3D) vegetation growth model is utilized for the analyzing and for the identifying of future encroachment areas by:
        providing-visual imagery data to the vegetative modeler for identification of a specific region corresponding to the electric utility using camera angle and position of an imaging system to identify current encroachment points from the visual imagery data;
        analyzing, using the image analyzer and the at least one 3D vegetation growth model, images of vegetation that is growing around an electricity distribution asset segment of the electric utility including identifying locations of the vegetation relative to locations of the electricity distribution asset segment and to identify specific types of the vegetation including types of trees, bushes and vines;
        utilizing at least the locations of the vegetation relative to the locations of the electricity distribution asset segment and the specific types of the vegetation to generate a predicted timing of encroachment of the electricity distribution asset segment by the vegetation to identify the future encroachment areas;
        automatically scheduling vegetative maintenance of the vegetation for the future encroachment areas by scoring regions by importance considering a population impacted or distribution circuits affected;
        transmitting, using an outage management system, data to the computing system implementing the vegetative modeler, wherein the data indicating a sustained outage along the electricity distribution asset segment, the data from the outage management system supports re-prioritization of the scheduled vegetative maintenance;
        controlling prioritization of the scheduled vegetative maintenance based on ranking which is relative to outage impacts to critical customers such as at least hospitals, public safety and governmental offices based upon node structure of circuit of the electric utility which impact the vegetation maintenance; and
        generating the scheduling of the vegetation management contractors and vegetative maintenance by obtaining bids using the predicted timing of the encroachment and the future encroachment areas to vegetative management contractors, the vegetative management contractors place bid where a scheduler utilizes the bid.

2. The method of claim 1, wherein the images of vegetation comprise at least one of satellite imagery, unmanned aerial vehicle (UAV) imagery, drone inspection footage, mobile laser-derived imagery, and camera-derived photographs.

3. The method of claim 1, wherein the vegetative modeler includes regional weather prediction models and agriculture growth prediction models for the vegetation that utilizes the weather prediction models.

4. The method of claim 1, wherein the predicted time of the encroachment utilizes a predictive analytics that generates numerical scores which indicate relative priority in performing maintenance around the locations of the electricity distribution asset segment.

5. The method of claim 1, wherein the images of the vegetation are indexed using their corresponding time and location.

6. The method of claim 1, further comprising making available the predicted timing of the encroachment and the future encroachment areas to vegetative management contractor for obtaining bids.

7. The method of claim 1, further comprising a reconciler to track of work performed at a specific region corresponding to a utility's cost center within a specific time period to create efficiency metrics to assist the electric utility.

8. A non-transitory computer readable medium containing instruction that when executed by at least one processing device cause the at least one processing device to:
    implement a vegetative modeler including an image analyzer and at least one 3-dimensional (3D) vegetation growth model is utilized for the analyzing and for the identifying of future encroachment areas by:
        provide visual imagery data to the vegetative modeler for identification of a specific region corresponding to the electric utility using camera angle and position of an imaging system to identify current encroachment points from the visual imagery data;
        analyze, using the image analyzer and the at least one 3D vegetation growth model, images of vegetation that is growing around an electricity distribution asset segment of the electric utility including identifying locations of the vegetation relative to locations of the electricity distribution asset segment and to identify specific types of the vegetation including types of trees, bushes and vines;
utilize the locations of the vegetation relative to the locations of the electricity distribution asset segment and the specific types of the vegetation to generate a predicted timing of encroachment of the electricity distribution asset segment by the vegetation to identify the future encroachment areas;
automatically schedule vegetative maintenance of the vegetation for the future encroachment areas by scoring regions by importance considering a population impacted or distribution circuits affected;
transmit, using an outage management system, data to the computing system implementing the vegetative modeler, wherein the indicating a sustained outage along the electricity distribution asset segment, the data from the outage management system supports re-prioritization of the scheduled vegetative;
control prioritization of the scheduled vegetative maintenance based on ranking which is relative to outage impacts to critical customers such as at least hospitals, public safety and governmental offices based upon node structure of circuit of the electric utility which impact the vegetation maintenance; and
generate the scheduling of the vegetation management contractors and vegetative maintenance by obtain bid using the predicted timing of the encroachment and the future encroachment areas to vegetative management contractors, the vegetative management contractors place bid where a scheduler utilizes the bid.

9. The non-transitory computer readable medium of claim 8, wherein the images of vegetation comprise at least one of satellite imagery, unmanned aerial vehicle (UAV) imagery, drone inspection footage, mobile laser-derived imagery, and camera-derived photographs.

10. The non-transitory computer readable medium of claim 8, wherein the vegetative modeler includes regional weather prediction models and agriculture growth prediction models for the vegetation that utilizes the weather prediction models.

11. The non-transitory computer readable medium of claim 8, wherein the predicted time of the encroachment utilizes a predictive analytics that generates numerical scores which indicate relative priority in performing maintenance around the locations of the electricity distribution asset segment.

12. The non-transitory computer readable medium of claim 8, wherein the images of the vegetation are indexed using their corresponding time and location.

13. The non-transitory computer readable medium of claim 8, further containing instruction that when executed by at least one processing device cause the at least one processing device to:
configure a reconciler to track of work performed at a specific region corresponding to a utility's cost center within a specific time period to create efficiency metrics to assist the electric utility.

* * * * *